(12) United States Patent
Boyton et al.

(10) Patent No.: US 7,508,609 B2
(45) Date of Patent: Mar. 24, 2009

(54) FORMATTED STORAGE MEDIA PROVIDING SPACE FOR ENCRYPTED TEXT AND DEDICATED SPACE FOR CLEAR TEXT

(75) Inventors: Jeff Robert Boyton, Fort Collins, CO (US); Matthew Thomas Starr, Lafyette, CO (US); Stuart Alan Craig, Lafyette, CO (US)

(73) Assignee: Spectra Logic Corporation, Denver, CO (US)

( * ) Notice: Subject to any disclaimer, the term of this patent is extended or adjusted under 35 U.S.C. 154(b) by 183 days.

(21) Appl. No.: 11/586,259

(22) Filed: Oct. 25, 2006

(65) Prior Publication Data

US 2008/0100945 A1     May 1, 2008

(51) Int. Cl.
G11B 5/09     (2006.01)
(52) U.S. Cl. ...................................... 360/48
(58) Field of Classification Search .............. 360/77.12, 360/48, 75, 76, 40; 711/162, 170; 700/94; 235/379; 705/52
See application file for complete search history.

(56) References Cited

U.S. PATENT DOCUMENTS

| | | | |
|---|---|---|---|
| 5,055,951 A * | 10/1991 | Behr ........................ 360/77.12 |
| 5,394,280 A * | 2/1995 | Chliwnyj et al. ......... 360/77.12 |
| 5,396,376 A * | 3/1995 | Chambors et al. .............. 360/48 |
| 5,463,772 A | 10/1995 | Thompson et al. |
| 5,615,264 A * | 3/1997 | Kazmierczak et al. ........ 705/52 |
| 5,630,092 A | 5/1997 | Carreiro et al. |
| 5,764,762 A * | 6/1998 | Kazmierczak et al. ........ 705/52 |
| 5,790,848 A | 8/1998 | Wlaschin |
| 5,920,873 A | 7/1999 | Van Huben et al. |
| 5,949,604 A * | 9/1999 | Saliba .......................... 360/76 |
| 6,031,671 A * | 2/2000 | Ayres ........................... 360/40 |
| 6,031,682 A * | 2/2000 | Nelson ..................... 360/77.12 |
| 6,044,442 A | 3/2000 | Jesionowski |
| 6,065,087 A | 5/2000 | Keaveny et al. |
| 6,084,740 A * | 7/2000 | Leonhardt et al. ......... 360/78.02 |
| 6,094,654 A | 7/2000 | Van Huben et al. |
| 6,134,070 A * | 10/2000 | Tran et al. ...................... 360/75 |
| 6,138,201 A | 10/2000 | Rebalski |
| 6,236,529 B1 * | 5/2001 | Leonhardt et al. ........ 360/77.12 |
| 6,342,983 B1 * | 1/2002 | Nonoyama et al. ............ 360/48 |

(Continued)

FOREIGN PATENT DOCUMENTS

WO     WO 2005/010661 A2     2/2005

(Continued)

OTHER PUBLICATIONS

U.S. Appl. No. 11/126,025, filed May 10, 2005, Rector et al.

(Continued)

*Primary Examiner*—Fred Tzeng

(57) ABSTRACT

A storage library is provided for formatting a mobile data storage element, such as a tape, with a first space dedicated for clear text or text as received by a host, such as an Independent Software Vender, wherein the first space is intended to accommodate header information which includes attributes about the mobile storage element. The data storage element is also formatted with a second space for storing encrypted or conditioned user data. The storage library further generally includes an encryption engine for encrypting data received from a host computer, a plurality of data storage elements, and at least two drives for storing data on the data storage elements.

21 Claims, 16 Drawing Sheets

U.S. PATENT DOCUMENTS

| | | | |
|---|---|---|---|
| 6,480,351 B2 * | 11/2002 | Leonhardt et al. | 360/77.12 |
| 6,505,138 B1 | 1/2003 | Leonard | |
| 6,532,121 B1 | 3/2003 | Rust et al. | |
| 6,708,166 B1 | 3/2004 | Dysart et al. | |
| 6,754,798 B1 | 6/2004 | Peloquin et al. | |
| 6,839,824 B2 | 1/2005 | Camble et al. | |
| 7,142,389 B2 * | 11/2006 | Nakao | 360/77.12 |
| 7,164,551 B2 * | 1/2007 | Urano et al. | 360/77.12 |
| 7,293,150 B2 * | 11/2007 | Witt et al. | 711/170 |
| 7,307,809 B2 * | 12/2007 | Neumann | 360/77.12 |
| 7,334,099 B2 * | 2/2008 | Witt et al. | 711/162 |
| 2002/0064118 A1 | 5/2002 | Korfin et al. | |
| 2002/0109928 A1 * | 8/2002 | Leonhardt et al. | 360/48 |
| 2002/0144044 A1 | 10/2002 | Moon et al. | |
| 2003/0126225 A1 | 7/2003 | Camble et al. | |
| 2003/0126309 A1 | 7/2003 | Camble et al. | |
| 2003/0126360 A1 | 7/2003 | Camble et al. | |
| 2003/0126395 A1 | 7/2003 | Camble et al. | |
| 2003/0126396 A1 | 7/2003 | Camble et al. | |
| 2003/0126460 A1 | 7/2003 | Camble et al. | |
| 2003/0135672 A1 | 7/2003 | Yip et al. | |
| 2003/0188153 A1 | 10/2003 | Demoff et al. | |
| 2004/0105187 A1 | 6/2004 | Woodruff et al. | |
| 2004/0111676 A1 | 6/2004 | Jang et al. | |
| 2004/0143597 A1 | 7/2004 | Benson et al. | |
| 2004/0153642 A1 | 8/2004 | Plotkin et al. | |
| 2004/0158711 A1 | 8/2004 | Zimmer | |
| 2004/0223253 A1 | 11/2004 | Woodruff et al. | |
| 2004/0264037 A1 | 12/2004 | Downey et al. | |
| 2004/0264038 A1 | 12/2004 | Heineman et al. | |
| 2004/0264039 A1 | 12/2004 | Armagost et al. | |
| 2004/0264040 A1 | 12/2004 | Armagost et al. | |
| 2004/0264041 A1 | 12/2004 | Kumpon et al. | |
| 2004/0264042 A1 | 12/2004 | Pollard et al. | |
| 2005/0007692 A1 | 1/2005 | Thompson et al. | |
| 2005/0047258 A1 | 3/2005 | Starr et al. | |
| 2005/0063089 A1 | 3/2005 | Starr et al. | |
| 2005/0065637 A1 | 3/2005 | Lantry et al. | |
| 2005/0185323 A1 | 8/2005 | Brace et al. | |
| 2005/0192686 A1 * | 9/2005 | Hirota et al. | 700/94 |
| 2005/0195517 A1 | 9/2005 | Brace et al. | |
| 2005/0195518 A1 | 9/2005 | Starr et al. | |
| 2005/0195519 A1 | 9/2005 | Kumpon et al. | |
| 2005/0195520 A1 | 9/2005 | Starr et al. | |
| 2005/0219964 A1 | 10/2005 | Pollard et al. | |
| 2005/0231845 A1 * | 10/2005 | Shirouzu | 360/48 |
| 2005/0246484 A1 | 11/2005 | Lantry et al. | |
| 2005/0267627 A1 | 12/2005 | Lantry et al. | |
| 2006/0064953 A1 | 3/2006 | Wong | |
| 2006/0070059 A1 | 3/2006 | Starr et al. | |
| 2006/0095657 A1 | 5/2006 | Rector et al. | |
| 2006/0112138 A1 | 5/2006 | Fenske et al. | |
| 2006/0134997 A1 | 6/2006 | Curtis et al. | |
| 2006/0161936 A1 | 7/2006 | Permut et al. | |
| 2006/0164928 A1 | 7/2006 | Starr et al. | |
| 2006/0202012 A1 * | 9/2006 | Grano et al. | 235/379 |
| 2006/0215300 A1 | 9/2006 | Starr et al. | |
| 2007/0106856 A1 * | 5/2007 | Nomura et al. | 711/162 |

FOREIGN PATENT DOCUMENTS

| | | |
|---|---|---|
| WO | WO 2006/065860 | 6/2006 |
| WO | WO 2006/069183 | 6/2006 |

OTHER PUBLICATIONS

U.S. Appl. No. 11/145,768, filed Jun. 6, 2005, Downey et al.
U.S. Appl. No. 11/230,146, filed Sep. 19, 2005, Starr et al.
U.S. Appl. No. 11/240,893, filed Sep. 30, 2005, Starr et al.
U.S. Appl. No. 11/264,920, filed Nov. 2, 2005, Lantry et al.

* cited by examiner

FORMATTED STORAGE MEDIA PROVIDING SPACE FOR ENCRYPTED TEXT AND DEDICATED SPACE FOR CLEAR TEXT

CROSS-REFERENCE TO RELATED APPLICATIONS

None

FIELD OF THE INVENTION

The present invention relates generally to formatting a mobile storage element with a first space for accommodating Independent Software Vender header information which includes attributes about the mobile storage element and a second space for storing encrypted or conditioned user data, the first space being dedicated for clear text.

BACKGROUND

The data storage industry is experiencing a boom fueled in part by aggressive cost reduction of data storage due to advances in storage technology, broadened international accessibility to the internet and World Wide Web, and the public's appetite to accumulate data. Unfortunately, with the boom has come associated undesirable activities, such as data attacks and data theft. Data stored in data storage libraries are among the primary targets of such attacks and theft.

Data storage libraries serve as data receptacles for a variety of clients including businesses, governments and the general populace. These libraries generally include drive storage devices adapted to read and write data to and from media which can be archived within the libraries. Traditionally, tape media has been used in many of the mainstream storage libraries due to the relatively high storage capacity and data integrity robustness of tapes. One advantage of utilizing tape media is its mobility which permits achievability in remote locations called "vaults", thereby making an "on line" data attack difficult, if not impossible. However, should an attacker acquire a tape, the data stored on the tape may be subject to unauthorized access. In attempts to prevent unauthorized access, the tape, or other mobile media capable of being used in a data storage library, can be armed with a number of security measures including data encryption. One fundamental component of data encryption is the knowledge of how to decode or decrypt the data; such knowledge is known to those skilled in the art as a decryption key. In order to increase security of data, decryption keys can be changed from one data set to another frequently enough to instill sufficient confidence that the encrypted data is secure.

Managing a multitude of tapes containing encrypted data can be a challenge, especially if identifying information associated with a particular tape is lost or difficult to obtain. Generally, a tape cassette is identifiable by indicia means such as a bar code affixed to the cassette or tag attached to the cassette which indicia is confirmed by reading header information when the cassette is cooperating with a drive. The header information is originally set up by an Independent Software Vendor used by the client of the data and generally includes attributes about the tape and data stored thereon. Should the indicia means be lost or the header information be unreadable or inaccessible for any other reason (i.e., the header data is corrupted or the header data is encrypted and cannot be decrypted), the tape is marked as a "bad tape" which will require further user intervention often resulting in the tape being discarded.

In an effort to improve managing mobile media with encrypted data (within a library or vault, for example) both methods and apparatus are disclosed herein. It is to innovations related to this subject matter that the claimed invention is generally directed.

SUMMARY OF THE INVENTION

The present invention relates generally to storing clear text header information and encrypted user data on a mobile storage element that may be used with a storage library and overcomes the disadvantages and limitations of the prior art by providing a method and apparatus for formatting a mobile storage element with a first space dedicated for Independent Software Vender header information which can include attributes about the mobile storage element stored in clear text and a second space for storing encrypted or conditioned user data.

One embodiment of the present invention can therefore comprise a tape cassette comprising: a magnetic recording tape formatted with a second space allocated for storing at least encrypted data for a user and a first space dedicated for storing clear text comprising at least one attribute about the tape cassette.

Another embodiment of the present invention can therefore comprise a method for formatting a magnetic recording tape comprising a first and second space wherein the tape is capable of receiving tape header information and user data from a host computer, the method comprising: dedicating the first space of the magnetic recording tape for clear text; storing the tape header information in the first space as received by the host computer; storing the user data in encrypted form in the second space.

Yet another embodiment of the present invention can therefore comprise a storage library comprising: an encryption engine capable of encrypting data received from a host computer; a plurality of data storage elements capable of storing the data, wherein the data comprises at least both user data and data storage element header data; at least two drives, each adapted to write data to one of the data storage elements; a means for providing the data storage element with both first and second storage spaces wherein the first storage space is reserved for only writing the data in an as-received form from the host computer and is further intended to comprise at least the data storage element header data, the second storage space capable of storing the user data in encrypted form.

In yet another embodiment of the present invention can therefore comprise a mobile data storage element formatted with a first data storage space for storing data in the form of essentially only clear text information that includes tape header information and a second data storage space for storing the data, at least some of which is encrypted.

DETAILED DESCRIPTION

Figure 1:
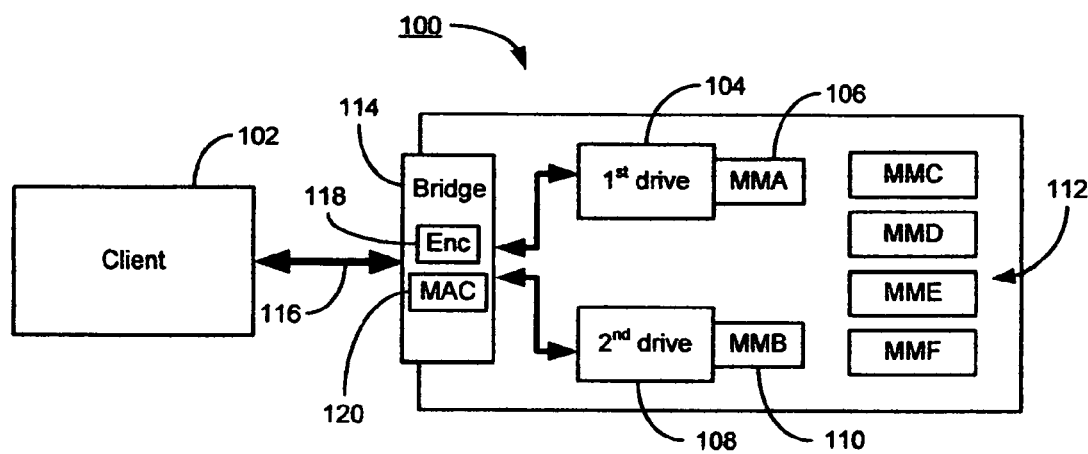
FIG. 1 is a block diagram showing a client in communication with a library consistent with embodiments of the present invention.

Referring to the drawings in general, and more specifically to FIG. 1, shown therein is a block diagram of a data storage arrangement capable of using a storage medium constructed in accordance with an embodiment of the present invention. In what follows, similar or identical structures are identified using identical callouts.

The data storage arrangement illustrated in FIG. 1 can comprise a client 102 communicating along a communication path 116 with a data storage library 100. The client 102 can be a host computer or some other consumer/producer of data; in other configurations the client 102 can, for example, also include another storage library or a streaming output device, such as a video server. The client 102 is an entity, or entities, typically capable of 'taking in' data. For example, a client 102 is a consumer when receiving data and a storage library 100 is a consumer when receiving data. As one skilled in the art will appreciate, in addition to 'taking in' data, a consumer of data is also generally capable of manipulating and/or transmitting data. The client 102 can be a personal computer, a main frame computer, a server, or any computer system operatively linked to the storage library 100, to name a few examples. The communication path 116 facilitates communication between the client 102 and the storage library 100. The means for communication can be accomplished by a dedicated pathway (such as a SCSI [Small Computer Systems Interface] cabled connection), fiber-channel or, alternatively, a pathway over a network (such as a LAN, WAN, or other communication architecture), for example. Furthermore, the communication path 116 can be in the form of a wire line pathway, wireless, or a combination thereof.

The library 100 illustratively comprises a combination bridge controller device 114 capable of making compatible communication traffic between at least a first drive 104 or a second drive 108 and the client 102. In one example, the client 102 may communicate via communication path 116 with the library 100 via fiber-channel using a fiber-channel protocol; however, the drives 104 and 108 included in the library 100 may be configured to communicate with the client 102 via SCSI-channel using a SCSI protocol. The combination bridge controller device 114 bridges (makes compatible) the communication differences between the client 102 and the components within the library 100, such as the first drive 104. The combination bridge controller 114 is further adapted to direct storage related communications, i.e., a data package, to either the first drive 104 that is cooperatively linked with mobile medium 'A' 106 and/or the second drive 108 that is cooperatively linked with mobile medium 'B' 110. A data package is considered a discrete article of data, such as, for example, a file, a group of data received in a substantially contiguous time interval, data that is linked (i.e., a folder), or data that is of a predetermined size, to name several examples. The library 100 also comprises a plurality of mobile media 112 capable of storing data. Mobile media 112 is generally understood to be media that can be moved within or outside of the library 100 and that can be, and is adapted to be, used with other compatible drive devices.

The combination bridge controller device 114 can comprise an encryption engine 118 capable of encrypting at least a data package received over the communication path 116 from the client 102. The encryption engine 118 can include software programs used with a processor, or alternatively, a chip comprising encryption capability, to name two non-limiting examples. The encryption engine 118 need only be capable of altering data from clear text, or in some cases data "as received" from the client 102, to a form requiring a key to decipher, or bring back the data to the "as received" state. An "as received" state could be in a form other than clear text, such as a data package previously encrypted or compressed by the client 102, for example.

In addition to the encrypted data, the combination bridge controller device 114 is also capable of transmitting a moniker, or nickname, associated with the key and a MAC (Message Authentication Code) generated by a MAC engine 120 for storage on a mobile medium, such as mobile medium 'A' 106, when in cooperation with a drive, such as the first drive 104. In one embodiment of the present invention the moniker can optionally be encrypted. The MAC provides a way to check the integrity of information transmitted over or stored in an unreliable medium (i.e., a mobile medium that is subject to tampering or simple data degradation due to adverse environmental conditions for data retention, to name a couple of examples). A MAC is typically an authentication tag (also called a checksum) derived by applying an authentication scheme, together with a secret key, to a message. Unlike digital signatures, MACs are computed and verified with the same key, typically to be verified by the intended recipient. Different types of MACs include: unconditionally secure based MACs, hash function-based MACs (HMACs), stream cipher-based MACs and block cipher-based MACs, to name a few options. The MAC and moniker are stored in association with a specific data package, file, or part of a file, and in one configuration, the MAC and moniker can be stored in block information, which generally includes block header and block trailer information created and managed by the library 100, such as that associated with each block in a file, for example. Upon decryption of the stored encrypted data, the moniker can be used to identify the key, thereby enabling the encryption engine 118 to decrypt the encrypted data package. Optionally, the moniker can be a clear text name for the key, for example the moniker 'SALLY' is the code name for the key "1ks39J0$A" wherein "SALLY" is stored on the media and cannot intrinsically decrypt the encrypted data, only the key can decrypt the encrypted data. In one embodiment, the library 100 may be the only entity that has knowledge of both the key and moniker, hence a library, or drive, different from the library 100 that stored the media will fail in attempts to decrypt the media unless it too has or obtains knowledge of the encryption key relative to the moniker. In an alternative embodiment, the moniker and key are uniquely known by the client 102 and attempts from another source to decrypt the encrypted data will fail. In yet another alternative embodiment, knowledge of the key and moniker may be in two or more locations, such as the client 102 and the library 100, for redundancy to ensure against the loss of the key in one of the locations, for example. The MAC can be used to guarantee that the decrypted data package has been unaltered from the data package prior to encryption upon processing the MAC through the MAC engine 120. Authenticating that the decrypted data package is complete and without change demonstrates that the decryption process was successfully accomplished and the data was not altered in any way.

Figure 2A:
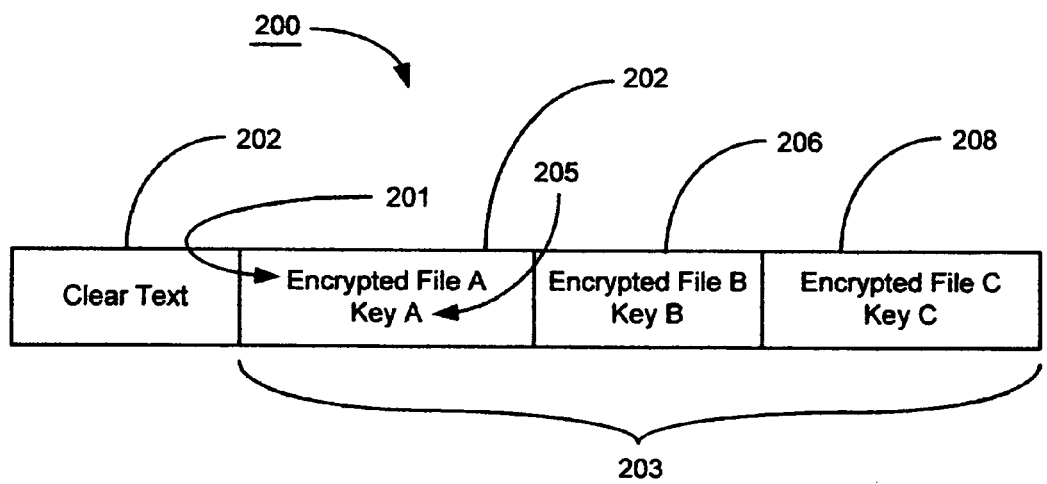
FIG. 2A is a block diagram showing a format embodiment of a portion of a recording tape in accordance with embodiments of the present invention.

FIG. 2A illustrates a format of a portion of a recording tape 200, which is generally comprised by a cassette (not shown), in accordance with embodiments of the present invention. The magnetic recording tape 200 is formatted with a first space 202 dedicated for storing clear text 202 and a second space 203 allocated for storing at least encrypted data for a user, or client 102. In addition to being encrypted, data in the second space 203 can be compressed, filtered, categorized or conditioned in a manner known to those skilled in the art, just to name several alternatives. The clear text space 202 may include, for example, information about at least one attribute regarding the tape cassette, the tape 200, and/or the data in the second space 203, such as tape identification information or a unique identifier for example. In one embodiment of the present invention, the clear text space 202 is allocated for access and use by a host or a client, such as the client 102, functioning as Independent Software Vendor (ISV), such Veritas software, from Symantec Corporation of Cupertino, Calif. In the preceding embodiment, a host, such as the host 102, through the ISV, can identify the tape 200 and attributes about the tape 200 via a stored tape header, for example, and yet have no access to the data in the second space 203 without knowledge of the associated key or keys. In an alternative embodiment, the first space 202 can comprise an identification field (not shown) adapted to accommodate at least one attribute about the encrypted data stored in the second space 203. In yet another alternative embodiment, the first space 202 and the second space 203 can be delineated by a marker, such as a file marker for example.

In yet another embodiment of the present invention, the originally stored data corresponding to the original tape 200 can be further protected against replication or reproduction. The clear text portion 202 can comprise a unique identifier coinciding with the originally recorded medium. Any data stored on a medium different from the original medium would be known via the unique identifier. Examples of unique identifiers include a time stamp, unsecured tape identification and a Secure Hash Algorithm (SHA), just to name a few examples. The SHA provides additional security in the event attempts are made to tamper with the unique identifier. An SHA is a unique cryptographic hash function, or signature, that provides some assurance that a downloaded file has not been altered.

As illustrated in FIG. 2A, the second space 203 comprises encrypted file A 201 and associated key A 205, encrypted file B and associated key B 206 and encrypted file C and associated key C 208. In one embodiment of the present invention, each key associated with a respective encrypted file, such as key A 205 associated with file A 201, can expire once a predetermined set of conditions are met, such as time expiration for example. In the preceding embodiment, the host 102 can manage any bypassing data operation associated with an expired key.

In an alternative embodiment of the present invention, tape header information can be stored in the clear text portion 202 such as that transmitted by an ISV when the tape is first used. Tape header information can include identification information about the tape, such as bar code information, tape storage capacity, tape model and manufacturer, original storage device, etc. In one embodiment, the bar code information stored in the header can be used to confirm that the externally exposed bar code coincides with the tape cassette. One benefit of having header information in clear text is that the tape can be identified without knowledge of any external cassette information, such as if an adhesive label printed with a bar code associated with a tape cassette becomes disattached from the cassette or is replaced by a different bar code, for example.

Figure 2B:
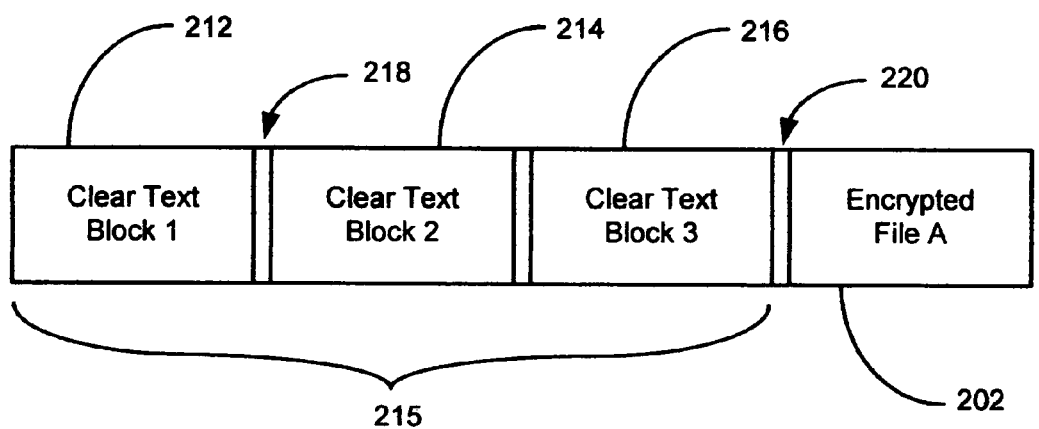
FIG. 2B is a block diagram showing an alternative embodiment of the present invention illustrating a clear text field divided into clear text blocks in accordance with embodiments of the present invention.

FIG. 2B is an alternative embodiment of the present invention illustrating a clear text field 215 divided into three clear text blocks, notably block-1212, block-2 214 and block-3 216. Each block 212, 214 and 216 can be separated by a file marker 218. The third file marker 220 delineates the clear text field 215 and where the encrypted files begin, such as file A 202. Hence, the third file mark 220 can be the "trigger" that initiates storage of encrypted data 202, regardless of how much data is defined by the ISV. The clear text blocks 212, 214 and 216 can be the same size or variable in length. It will be appreciated by one skilled in the art that the clear text field 215 can comprise one or more blocks. The blocks 212, 214 and 216 can each be associated with block meta data, such as a block header and trailer.

Figure 2C:
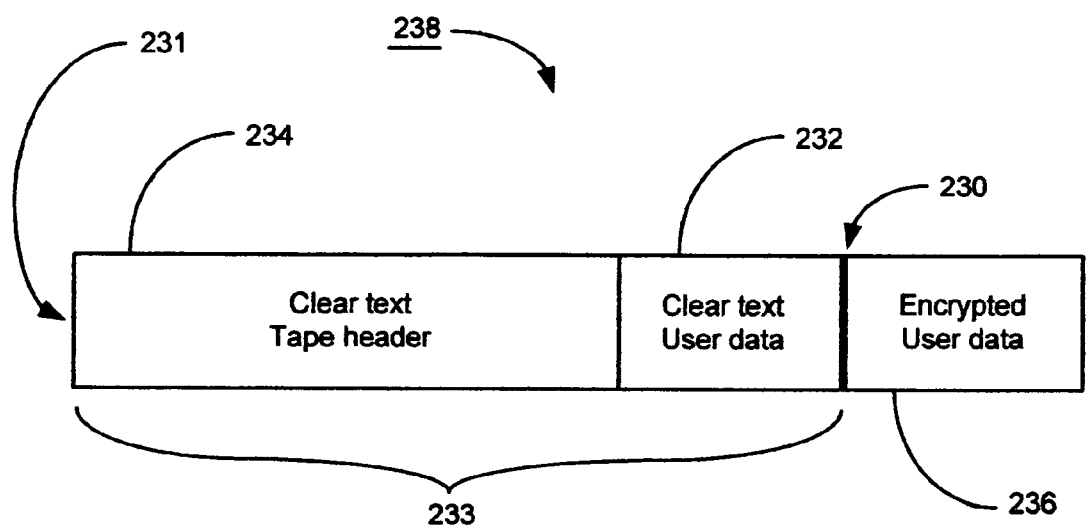
FIG. 2C is a block diagram showing yet another embodiment of the present invention illustrating a fixed data length clear text field in accordance with embodiments of the present invention.

FIG. 2C shows yet another embodiment of the present invention wherein the clear text portion 233 is a fixed data length. As illustratively shown, a fixed portion of a tape 238 is dedicated for clear text 233. Encrypted text 236 is shown following the clear text portion 233 at a delineation location 230. The delineation location 230 can simply be a fixed number of bytes from the beginning of tape 231. Hence, data starts to as clear text and then encrypts as soon as the delineation location 230 is encountered. Generally speaking, data is stored on tape in a sequential layout. Hence, when a new tape is used for data storage, an ISV will initiate the tape with tape header/identification information (tape identification for example) followed by user data. The storage library, such as library 100, simply stores all data in sequence with no knowledge that some data is tape header information and other data is user information. Therefore, without the ISV coordinating with the library to delineate user data and header information, such as by a file marker 220, for example, the first received user data may go unprotected as exemplified in clear text user data 232 of FIG. 2C.

Figure 3:
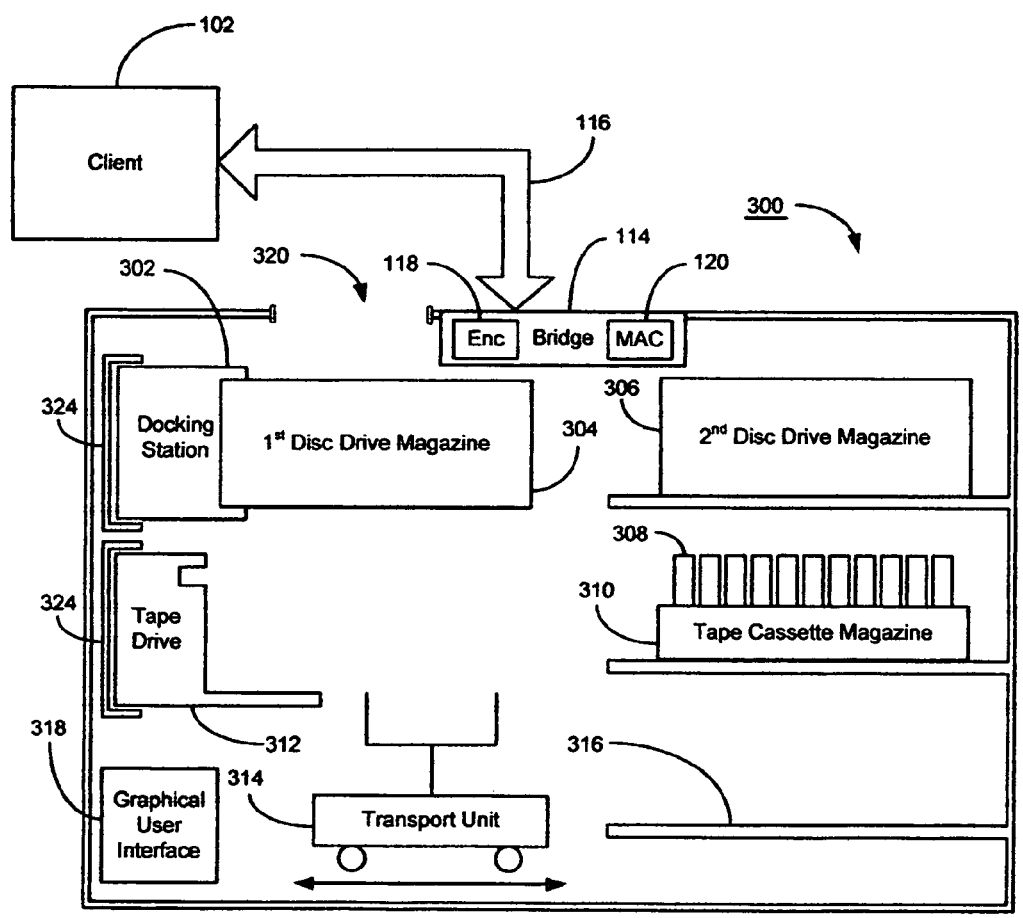
FIG. 3 is a schematic illustration showing an embodiment of the present invention illustrating a data storage library comprising two different embodiments of mobile storage media.

FIG. 3 is an embodiment of the present invention showing a data storage library 300 comprising two different mobile storage media element. As illustratively shown, the client 102 is in communication with the library 300 via the communication path 116 and the combination bridge controller device 114. The library 300 comprises two embodiments of a mobile storage medium, both a first and second disc dive magazine 304 and 306 (being a first medium type) and a tape cassette magazine 310 loaded with a plurality of tape cassettes 308 (being a second medium type). The library 300 also comprises a docking station 302 capable of reading and writing data to and from the first and the second disc drive magazines 304 and 306 and a tape drive 312 capable of reading and writing data to and from one of a plurality of tape cassettes 308 comprised by the tape cassette magazine 310. The library 300 can optionally comprise a shelving system 316 capable of archiving the mobile media 304, 306 and/or 310 within the library 300. A transport unit 314 comprises means to transport a mobile medium, such as the first disc drive magazine 304, from the shelf system 316 to a drive, in this case the docking station 302. In one configuration, the transport unit 314 can comprise a means to load a tape cassette 308 into the tape drive 312 in a cooperating relationship to read and write data, such as a robotic picking device (not shown) for example. The library 300 also optionally comprises an entry/exit port 320 whereby mobile media can be transferred between an environment external to the library 300 and an environment internal to the library 300. The library 300 is capable of encrypting data received by the client 102 and storing the encrypted data along with a moniker and MAC on a mobile medium after a dedicated clear text field, such as the clear text field 215. The clear text field can be on a tape cassette 308 and/or on a disc drive magazine, such as the first disc drive magazine 304 illustrated herein as that in cooperation with the docking station 302. The graphical user interface 318 is optionally capable of transmitting the moniker associated with a key required to decrypt the encrypted data as inputted by an operator, for example. The key can be randomly generated from a pool of numbers, letters and symbols, for example, and the moniker can be assigned to the key by an operator, for example. In one exemplary scenario, a mobile medium, such as the first disc drive magazine 304 (comprising encrypted data, a moniker and MAC associated with the encrypted data stored in the block header and/or trailer usually clear text), is capable of being removed from the library 300 via the entry/exit port 320 and disposed in an archive location, such as a room remote from the library 300. In an embodiment wherein the library 300 is the only entity with knowledge of the decryption key associated with the moniker, the encrypted data cannot be readily decrypted unless by the library 300. As described earlier, information identifying the library 300 can be stored in the clear text space, such as the first space 202 of FIG. 2A. The moniker can enable the library to quickly make a determination which key to use to decrypt. The key can be provided by the library 300 with knowledge of the moniker to, for example, a user, or a second authorized library or device capable of reading data from the mobile medium.

In an embodiment consistent with FIG. 3, the disc drive magazines 304 and 306 and tape cassette magazine 310 have substantially identical footprints to facilitate commonality for transporting within the data storage library 300 by the transport unit 314. An identifier, such as a bar code for example, can be associated with each disc drive magazine 304 or 306 or tape cassette magazine 31 and can be used to identify a disc drive magazine 304 or 306 or tape cassette magazine 310 if archived in a remote location for example, such as the archive vault for example.

In another embodiment of the present invention, the docking station 302 is substantially dimensionally identical to a full height LTO, SAIT or DLT tape cassette drive. Consequently, either an additional tape drive or docking station is capable of being interchangeably mounted in one of a plurality of drive bay assemblies 324, allowing the data storage library 300 an additional degree of flexibility.

Figure 4:
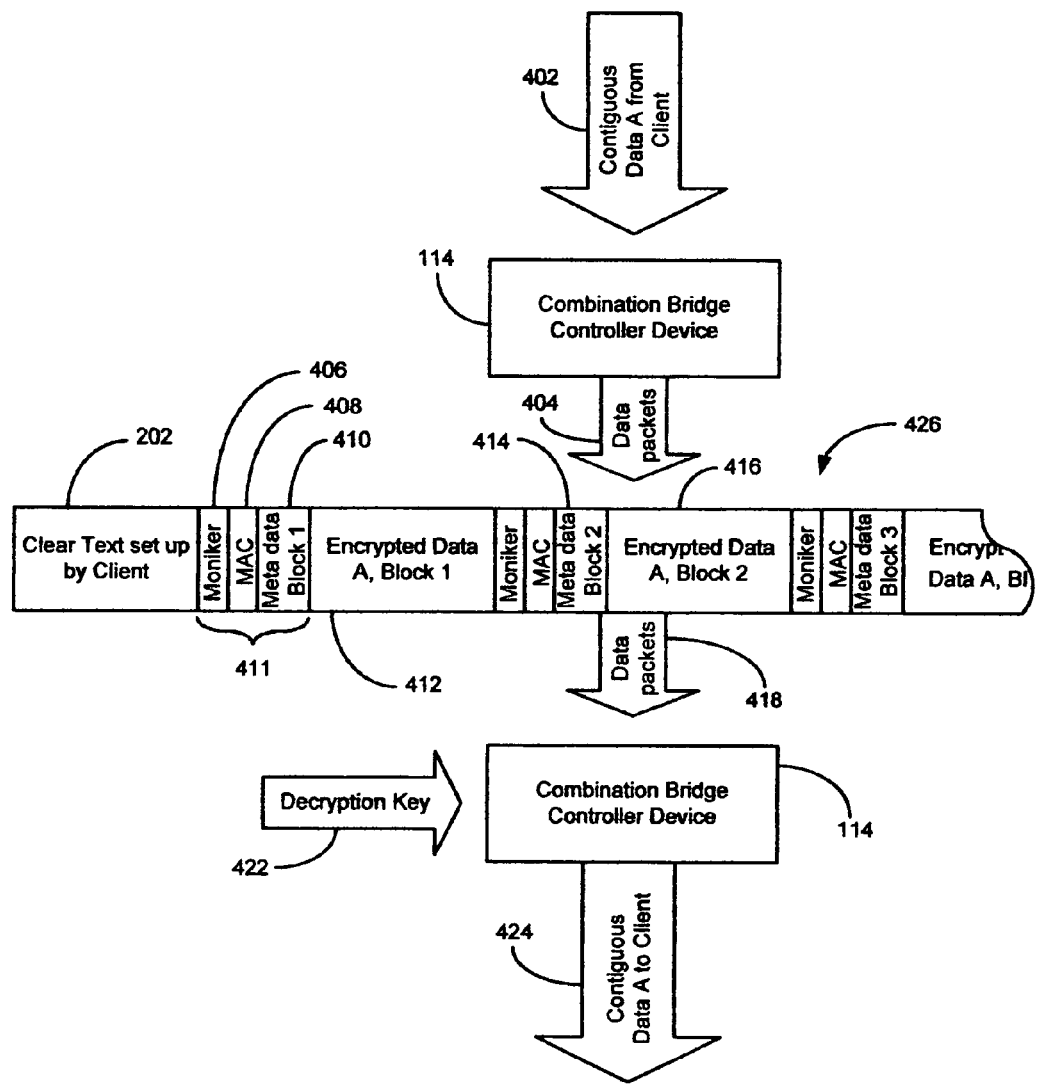
FIG. 4 is a block diagram consistent with an embodiment of the present invention showing streamed data packets stored on mobile media in a tape/streaming protocol with a clear text region set up by a client.

FIG. 4 is a block diagram consistent with an embodiment of the present invention showing streamed data packets stored on mobile media 426 in a tape/streaming protocol. The combination bridge controller device 114 is adapted to receive, in the illustration, contiguous data 'A' 402 from a client, such as the client 102, after setting up the clear text field 202 by the client 102. Following the clear text field 202, the combination bridge controller device 114 is capable of converting contiguous data 'A' 402 into discrete encrypted data packets 404 that are sent to a mobile storage medium 426 when cooperating with a drive capable of storing the data packets 404. Herein, the mobile storage medium 426 includes a moniker 406 associated with a decryption key 422 that is at least specific to the stored encrypted data 404. The decryption key 422 and associated moniker 406 can be different for each data package, fractions of data packages, numbers of data packages, or time when data packages are received and/or stored, to name several examples. In addition to the moniker 406, a MAC 408 can be stored on the medium 426. The moniker 406 and MAC 408 can optionally be stored in the clear text space, such as the first space 202 of FIG. 2A, or associated with, the mobile storage medium 426, or alternatively at the beginning of each encrypted data block 412 and 416 as illustrated here. As illustratively shown, the storage medium 426 comprises a sequence of encrypted data blocks such as encrypted data 'A' block 1 412, encrypted data 'A' block 2 416 and so on. Meta data, such as meta data block 1 410, is associated with each data block, such as encrypted data 'A' block 1 412 and is optionally written in clear text. By having the moniker 406 and MAC 408 associated with each block, the information can be used readily in the event a drive commences reading data on an ensuing block relative to block 1 412, i.e., block 2 416. One of ordinary skill will appreciate that the MAC 408 and the moniker 406 can be located in different arrangements including at the beginning of the stored data package, i.e., block 1 412, or arranged such that the moniker 406 is in one location and the MAC 408 is at the beginning of each block 412 and 416, for example, without departing from the scope and spirit of the present invention.

Upon decrypting the encrypted data 'A' stored on the medium 426, the moniker 406 is matched with the associated decryption key 422. Knowledge of the moniker 406 and the decryption key 422 can be in the combination bridge controller device 114, a different memory device within the library, such as library 100, or an alternative location, such as the client, or a combination therein, for example. Once the data packets 418 are decrypted, the MAC 408 can be used to validate the authenticity and integrity of the decrypted data (validating that the data is the same when decrypted as it was prior to encryption). In this embodiment, the combination bridge controller device 114 is also capable of assembling the decrypted data packets, such as the packets of block 1 412 and block 2 416, without the meta data, such as the associated meta data for block 1 410 and meta data for block 2 414, back to the original contiguous form 424 for transmission to the client 102 for example. In an alternative embodiment, the data can be stored as a contiguous data package without blocks with meta data as shown in FIG. 4.

Figure 5A:
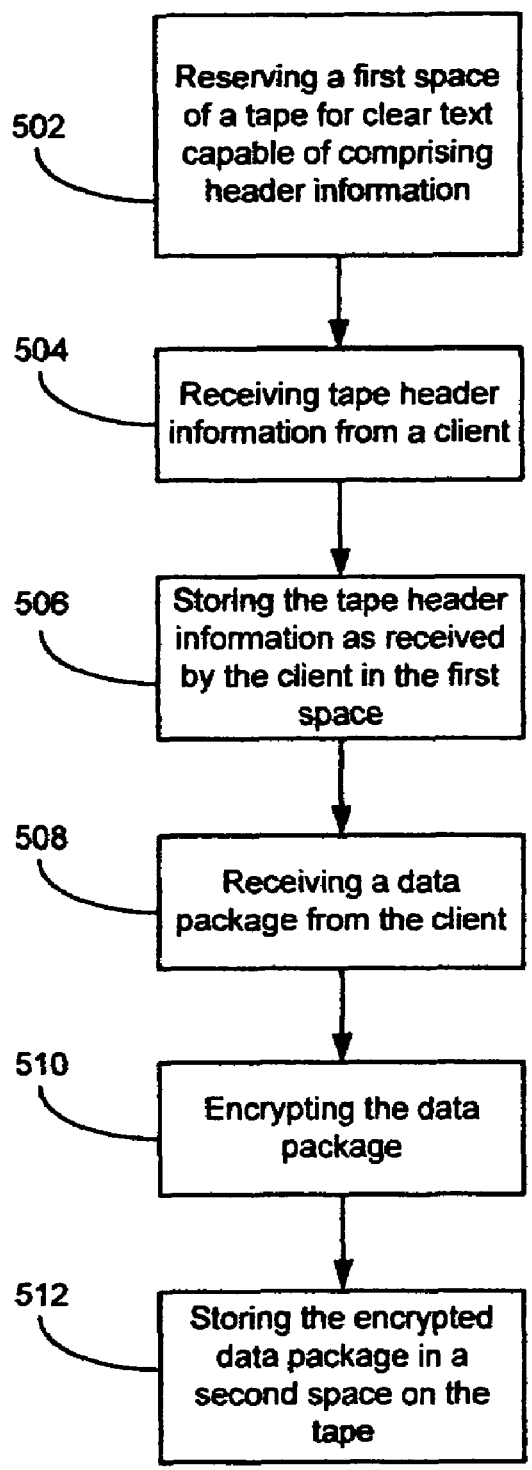
FIGS. 5A and 5B are block diagrams showing some methods wherein some embodiments of the present invention can be practiced.

Referring now to FIG. 5A in conjunction with FIGS. 1 and 2, shown therein is a method to practice an embodiment of the present invention. It should be recognized that the steps presented in the described embodiments of the present invention do not necessarily require any particular sequence. As shown in step 502, the data storage library 100 is capable of dedicating a first space of a tape for clear text, such as the clear text space 202 of tape 200, capable of comprising header information about the tape and/or data to be stored thereon. A means for dedicating the clear text space can be accomplished by a client 102 commanding, or setting up, a library or a partition of a library to format all tapes comprised therein with a clear text space dedicated for header information. In some configurations, a library can be divided into partitions wherein each partition can be allocated to a different client or alternatively one client with intentions to store different types of data in each partition, just to name a couple of examples. Such a setup can be performed on a Spectra Logic T950 data storage library 600, sold by Spectra Logic Corporation of Boulder, Colo., via a web interface of the Library Control Module (LCM), not shown, and sent to the bridge controller, such as the bridge controller 114, by way of the T950 library's Controller Area Network (CAN), not shown. Options for setting up the clear text portion of the tape by a client, appearing on the client's computer screen when linked to the library, can include: (a) Enabling or disabling clear text, (b) Type of clear region (Filemarks or Kbytes) and (c) Amount of clear region (number of Filemarks or number of Kbytes, depending on choice), for example.

Once the library 100, or partition of the library, is set up to include a region for clear text 202, the client 102, or ISV, sends tape header information for storage in the clear text region, as shown in step 504. As indicated by step 506, the tape header information is then stored on the tape in the clear text region in an "as received" state, which as earlier described can be in a state other than clear text whereby the library has no knowledge of or participation in active change to the data, such as compression or encryption for example. Following receipt of the tape header information, a data packet is usually sent to the library by the client for storage, as indicated by step 508. In step 510, the data storage library encrypts the data package. Means for encryption can be accomplished with an encryption engine 118, such as a large scale integration chip(s) or an algorithm capable of encryption operating through a central processing unit, to name two examples. The encrypted data is then stored in a location other than the first space, such as the second space 203 of the tape 200, as shown in step 512.

Figure 5B:
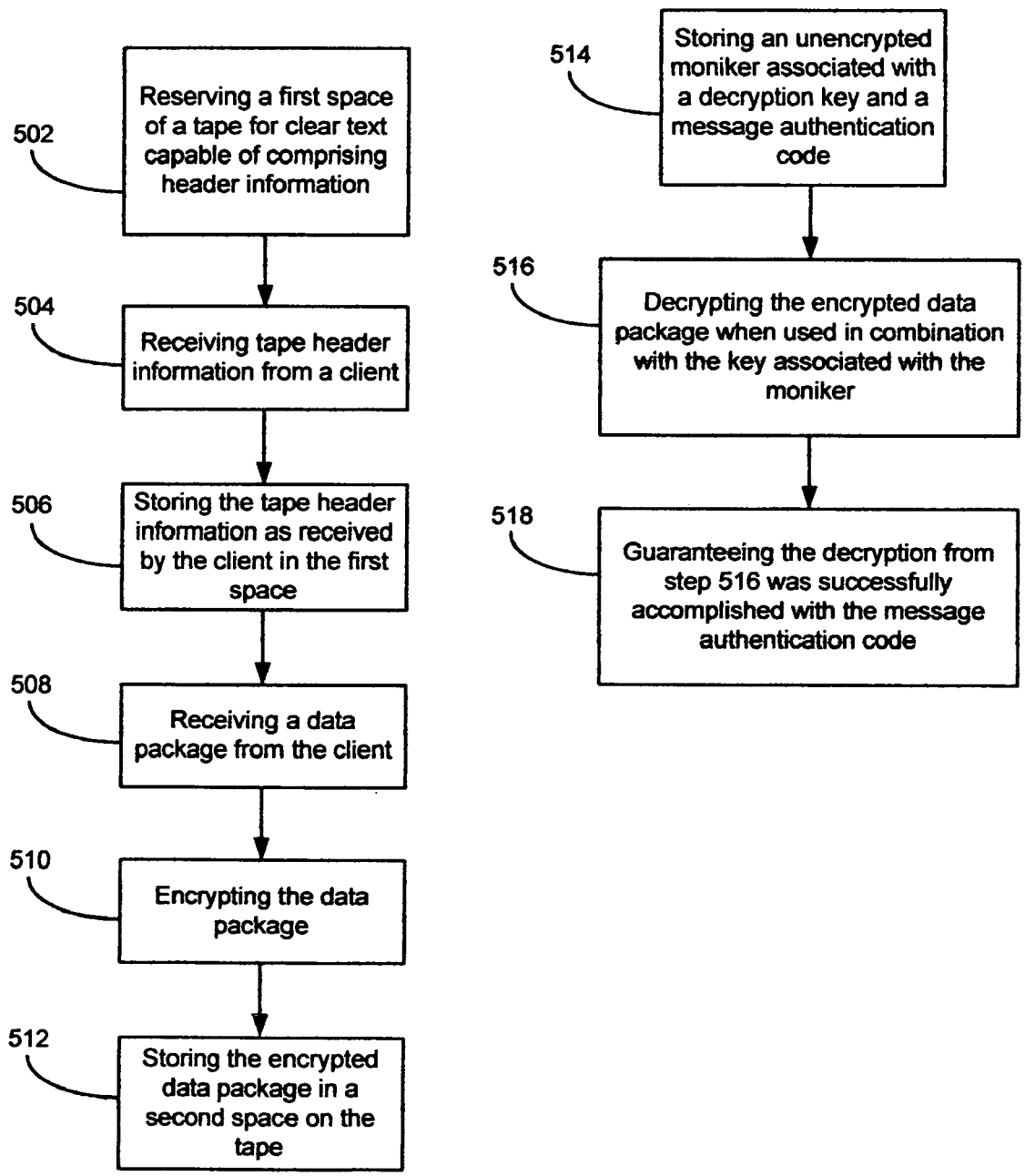

Referring to FIG. 5B in conjunction with FIGS. 1, 2 and 4, shown therein is an alternative method consistent with some embodiments of the present invention which includes method steps 502-512 from FIG. 5A. As shown in step 514, the data storage library 100 is capable of storing the encrypted data package, a message authentication code 408 and a moniker 406, from FIG. 4, on a mobile storage medium, such as mobile media 'A' 106, when cooperating with a drive, such as the first drive 104. The message authentication code 408 and the moniker 406 are typically stored in the block header and sometimes the block trailer which, in one embodiment of present invention, is in clear text. As shown in step 516, the data storage library 100 is capable of decrypting the encrypted data package 418 when used in combination with the key 422 associated with the moniker 406. Means for decrypting the encrypted data package 418 can be accomplished by an encryption/decryption chip (not shown) comprised by the combination bridge controller device 114. The key 422 required for decryption can be identified via the moniker 406 and can be known by the library 100, or optionally, in a second location or a combination thereof. As shown in step 518, the data storage library 100 is capable of guaranteeing the decrypted data package was successfully accomplished with confirmation of the message authentication code 408. Means for guaranteeing successful decryption can be accomplished by a MAC engine, such as the MAC engine 120, which in one embodiment can be combined with the encryption/decryption chip.

Figure 6A:
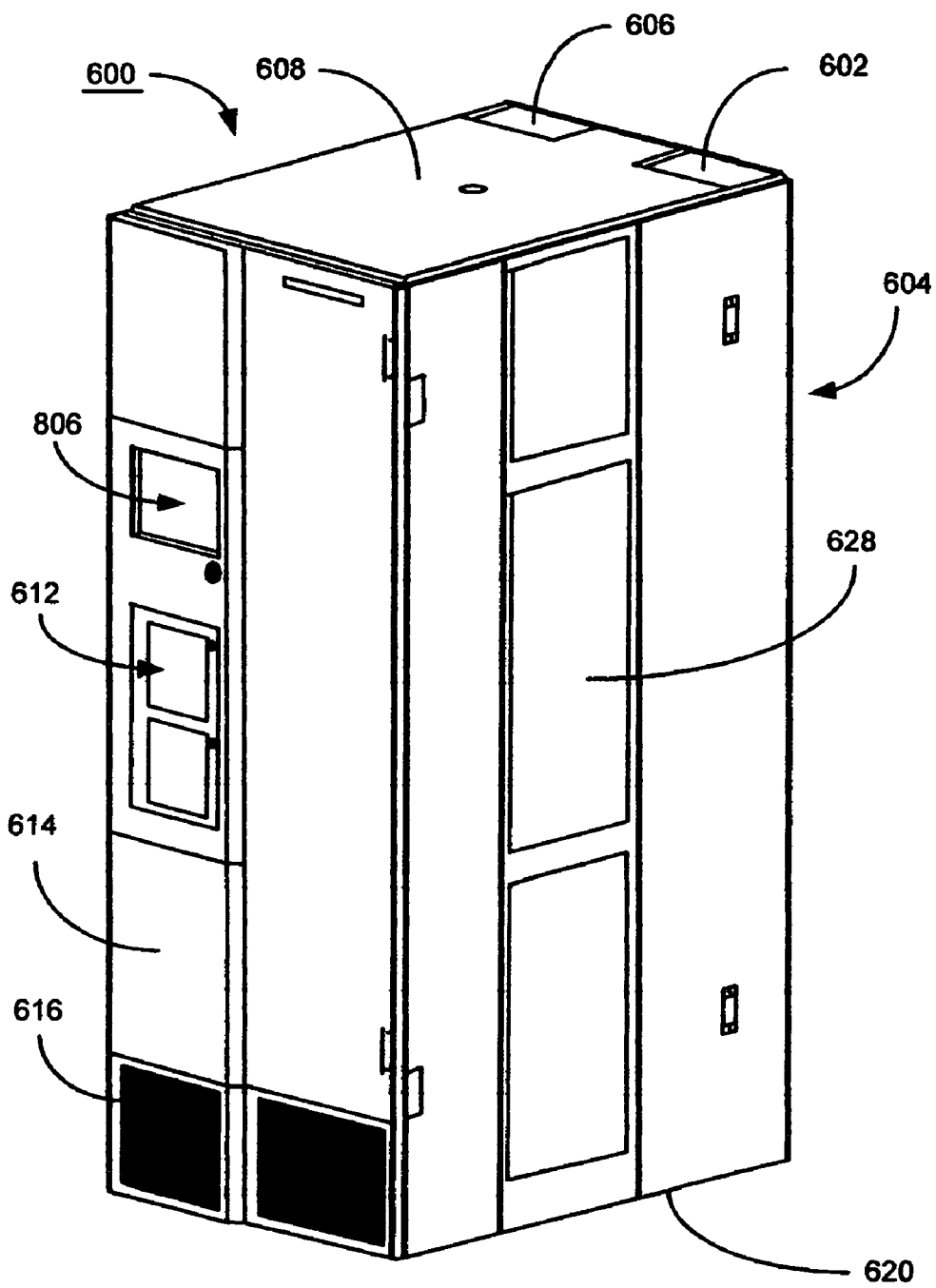
FIGS. 6A-6E are perspective illustrations showing different views and cross sections of a Spectra Logic T950 storage library in which some embodiments of the present invention can be practiced.
Figure 6B:
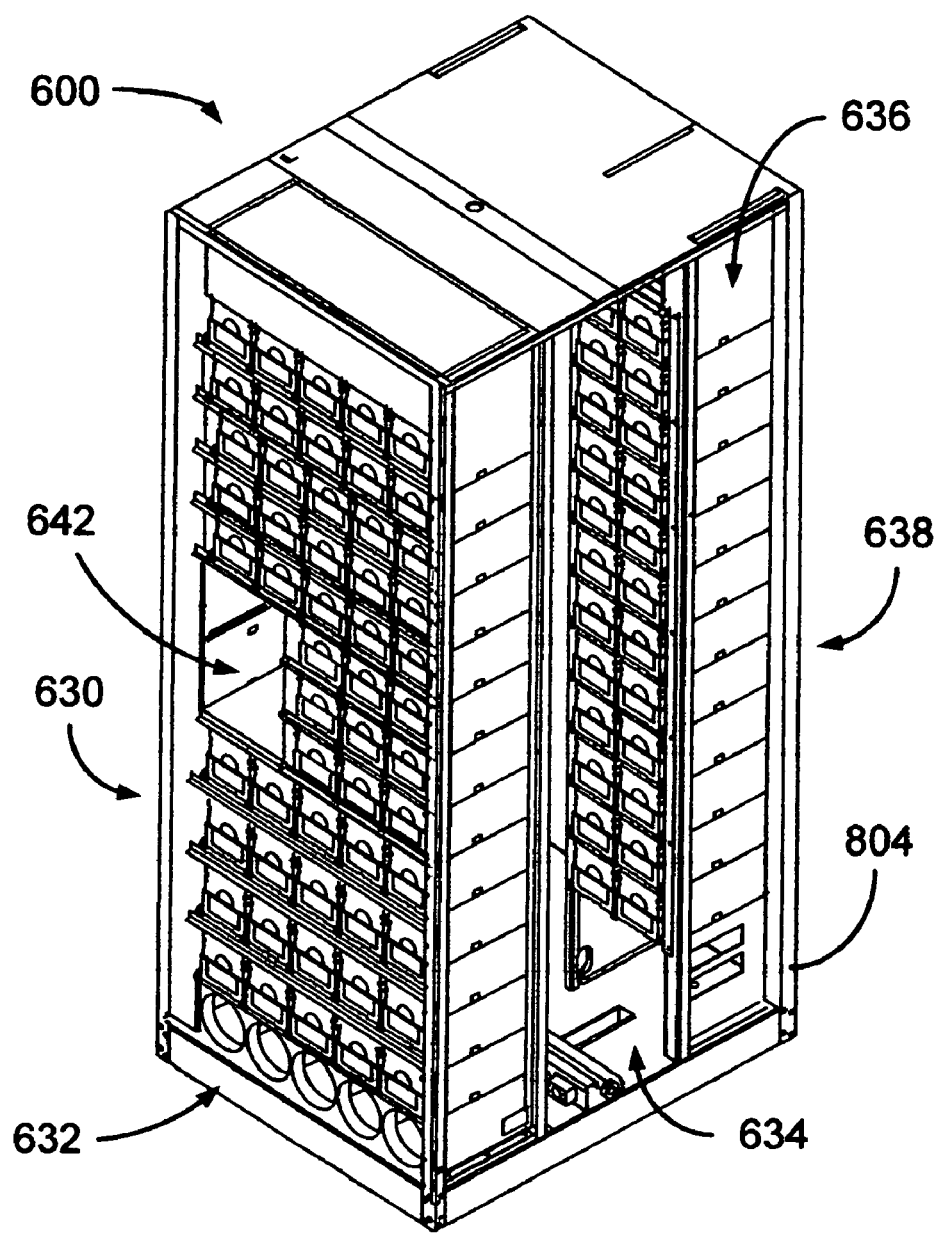
Figure 6C:
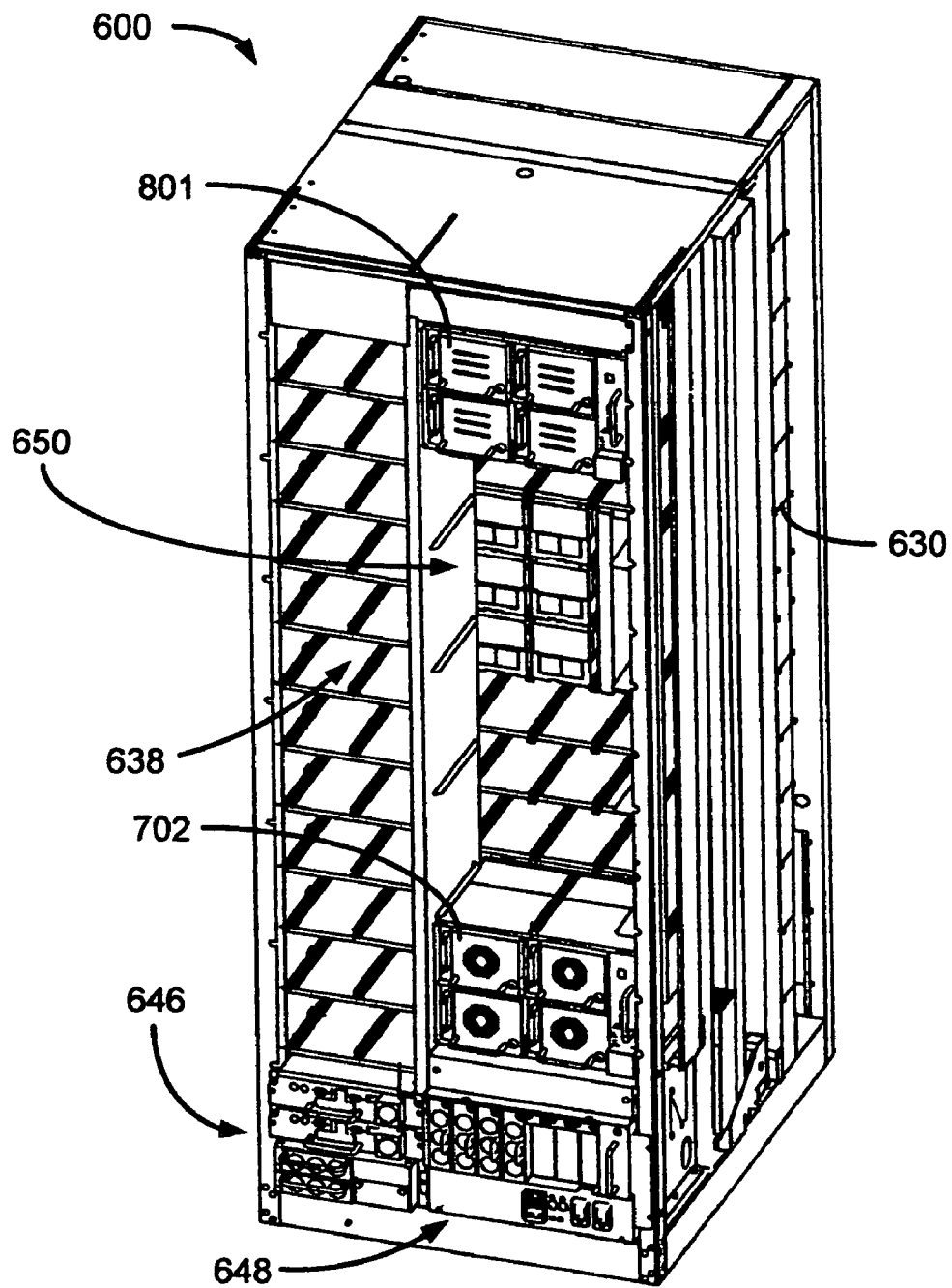
Figure 6D:
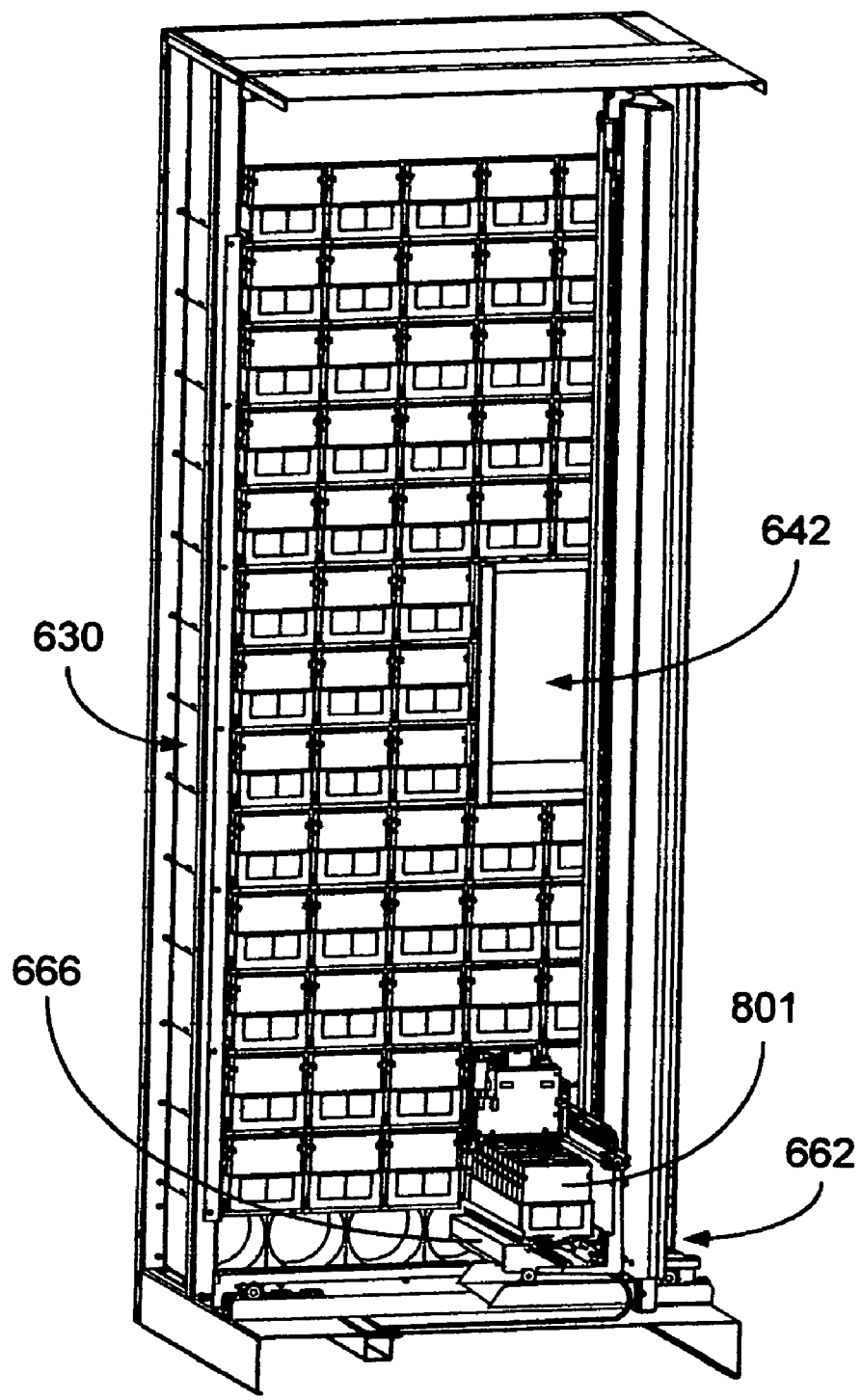
Figure 6E:
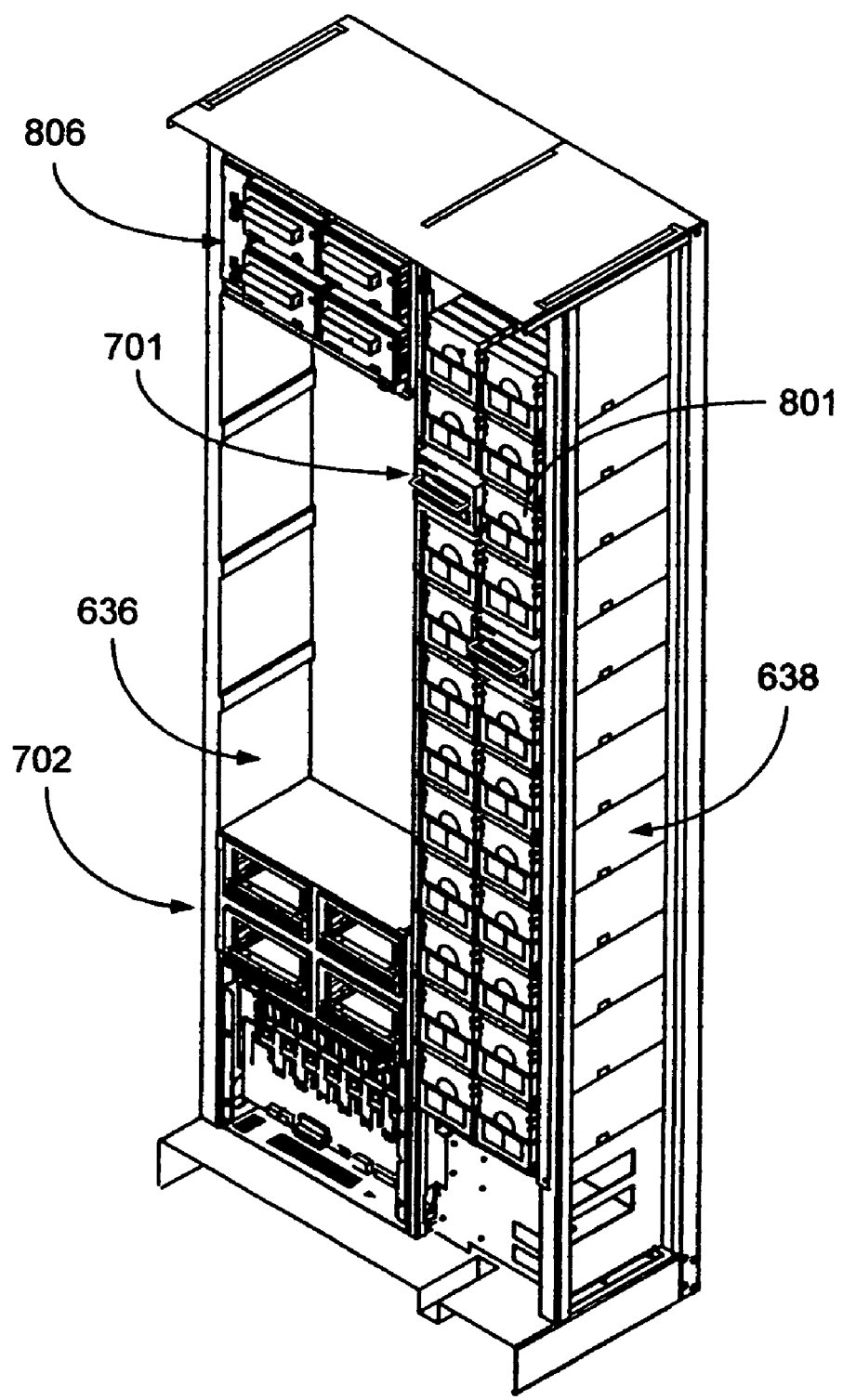
Figure 7:
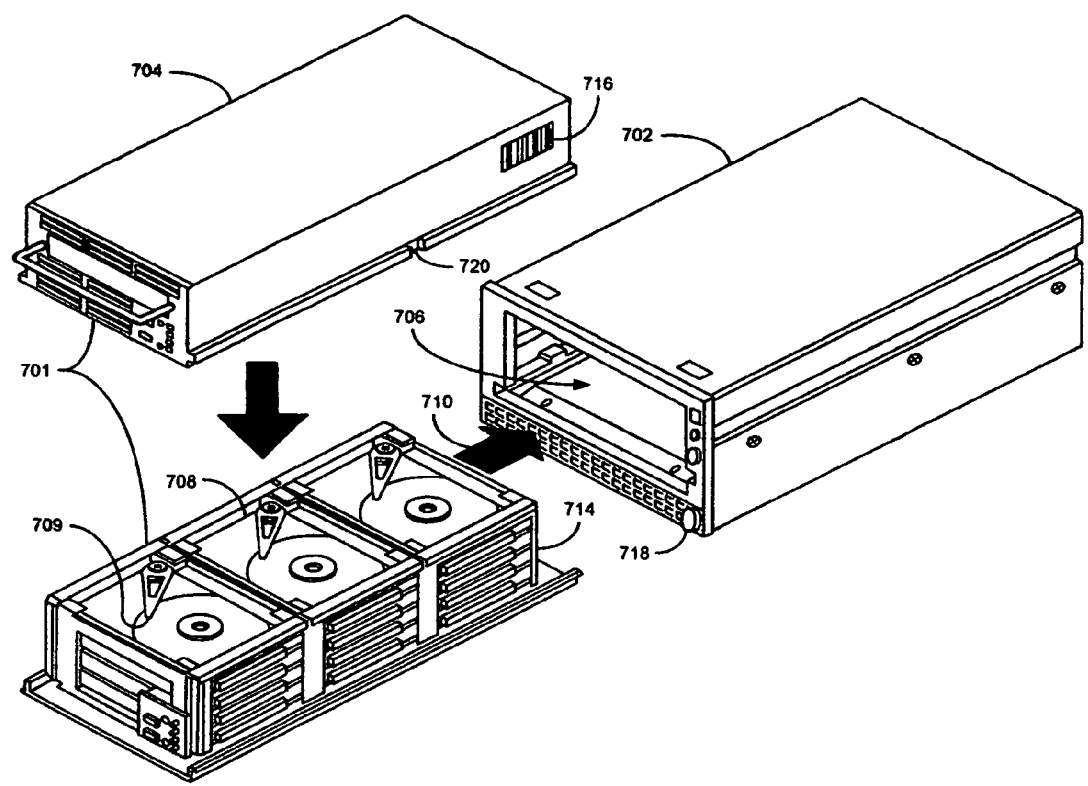
FIG. 7 is an exploded, perspective illustration of a disc drive magazine and docking station consistent with some embodiments of the present invention.

Embodiments of the present invention can be commercially practiced, for example, in connection with a Spectra Logic T950 data storage library 600 and components associated with the T950 library 600 as shown in FIGS. 6A-8B. The T950 library 600 is capable of comprising both disc drive magazines 701, as shown in FIG. 7, and a plurality of tape cassettes 802 that are disposed in a tape cassette magazine 800, shown in FIG. 8A. The T950 library 600 is capable of comprising a plurality of tape cassette magazines 800. A tape cassette 802 and a disc drive magazine 701 are two exemplary embodiments of a mobile storage medium.

In more detail, FIG. 7 shows an embodiment of a disc drive magazine 701 and docking station 702 consistent with some embodiments of the present invention. More specifically, shown herein is an RXT disc drive magazine and RXT docking station from Spectra Logic Corporation. As illustratively shown, a plurality of disc drives 708 are substantially encased by an enclosure 704 (four walls a top and a bottom) generally comprising the mobile disc drive magazine 701. Disposed on the enclosure is an optional bar code identifier 716 adapted to identify the disc drive magazine 701, which has utility should the disc drive magazine 701 be archived in a media pack storage vault, for example. A conventional magnetic disc drive 708 is only one embodiment of a random access storage device capable of being used in a mobile random access memory magazine such as the disc drive magazine 701 according to the present invention, which, in further embodiments, can include flash memory and optical memory, to name a few. The mobile disc drive magazine 701 is adapted to be received by an opening 706 in the docking station 702 as shown by the arrow 710. In one configuration, a loading device (not shown) is disposed in the docking station 702 and is adapted to automatically pull the mobile disc drive magazine 701 to engage the magazine 701 with the docking station 702 in electrical contact thereby establishing a communication link. When the mobile disc drive magazine 701 is operatively linked in a cooperating relationship with the docking station 702, both power and transmission of data can occur between the docking station 702 and the mobile disc drive magazine 701. The docking station 702 is shown to be capable of being electrically connected with a host computer, such as the client 102, or other storage device(s), such as another data storage library for example, by a coupling means, such as wires, plugs-in, wireless transmission (e.g., IR, RF), or any combination or equivalence thereof. In one embodiment, by linking the docking station 702 with the data storage library 600, a mobile disc drive magazine 701 is effectively in a cooperatively linked state with the other storage devices comprised by the storage library 600. The disc drive magazine 701 can be adapted to store data in a manner that emulates tape format such that a host substantially believes that the data stored and retrieved from the disc drive magazine 701 is from a tape.

Figure 8A:
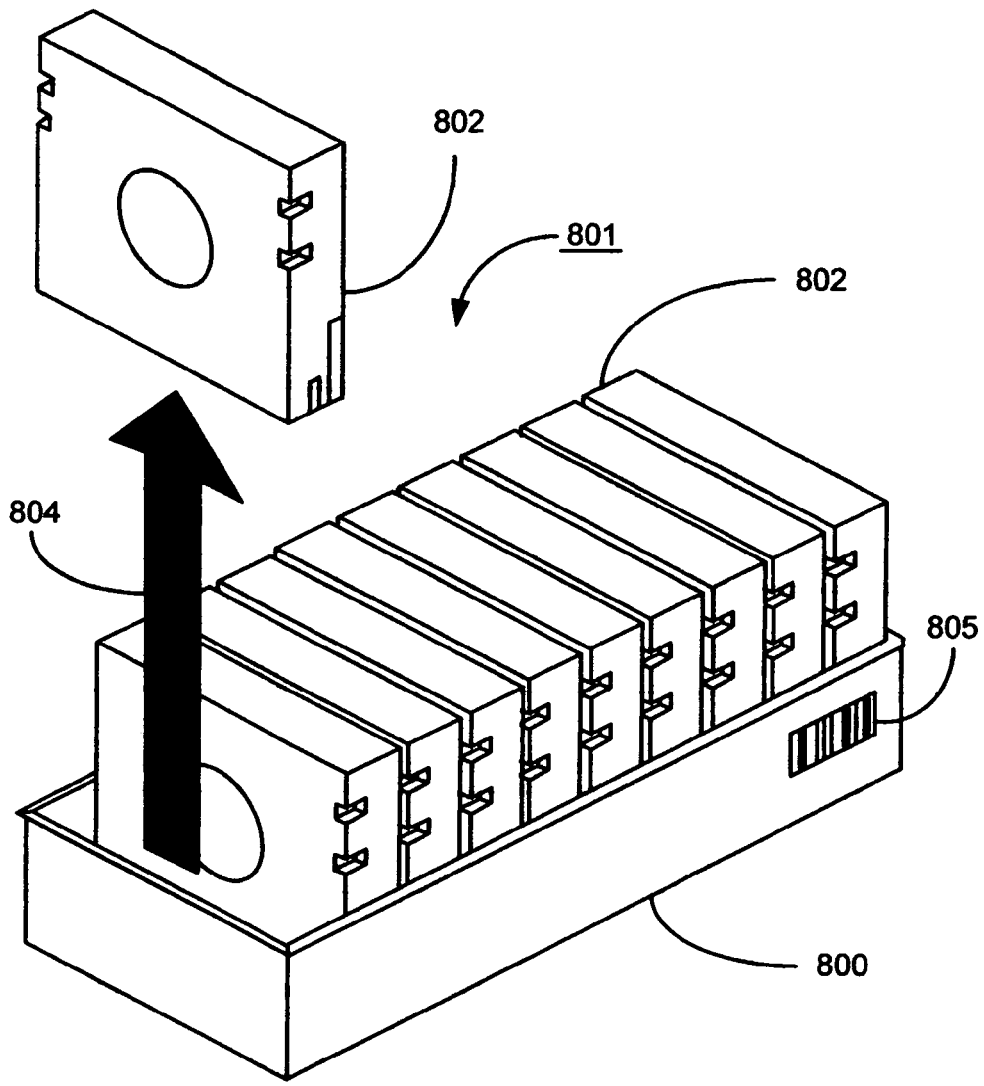
FIG. 8A is a perspective illustration showing a tape cassette magazine comprising tape cassettes consistent with some embodiments of the present invention.
Figure 8B:
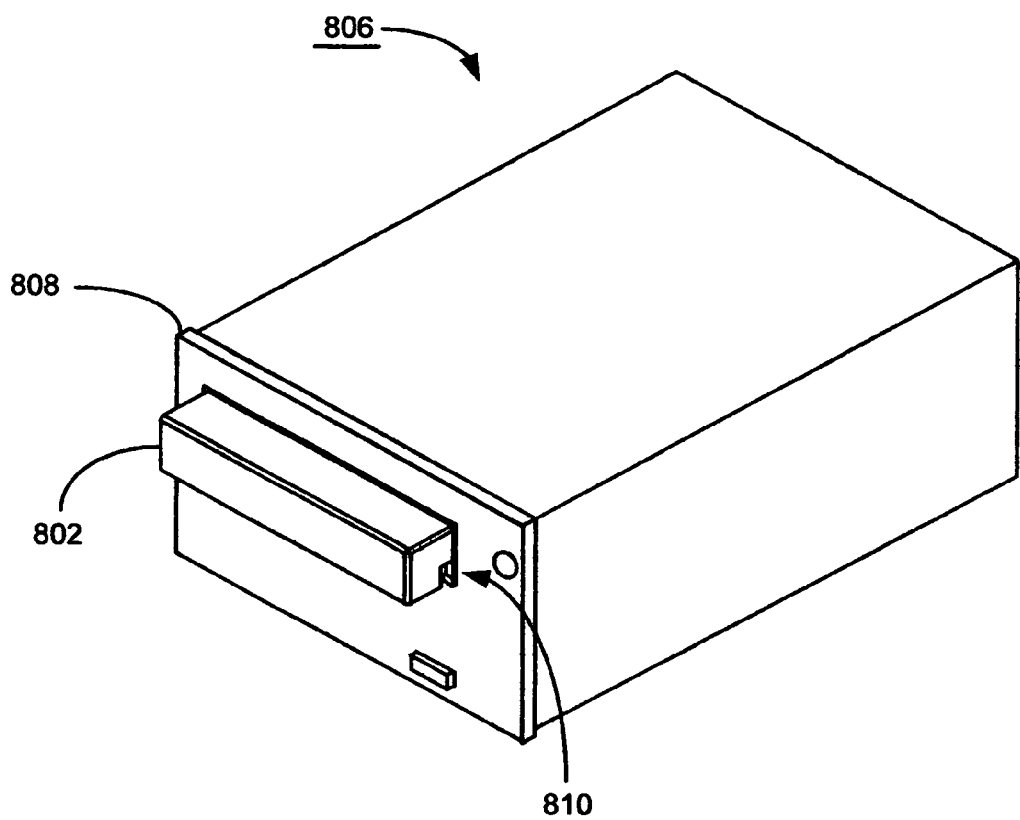
FIG. 8B is a perspective illustration showing a tape drive cooperating with a tape cassette consistent with some embodiments of the present invention.

With reference to FIG. 8A, shown therein are tape cassettes 802 supported by a tape cassette magazine 800 which are alternative embodiments of a mobile storage medium. In more detail, a tape cassette 802, such an LTO category tape cassette manufactured by IBM of Armonk, N.Y., comprises magnetic tape that is capable of storing digital data written by a compatible drive 806, such as an LTO tape drive manufactured by IBM, when in cooperation (i.e., loaded) with the tape cassette 802 as shown in FIG. 8B. The tape drive 806 is adapted to receive the tape cassette 802 in an accommodating opening 810 in the face 808 of the tape drive 806. FIG. 8A shows a populated tape cassette magazine 801 wherein a magazine support structure 666 (of FIG. 6D) is capable of holding a plurality of tape cassettes 802 disposed in the tape cassette magazine 800. A tape cassette 802 can be removed from the tape cassette magazine 800, as shown by the arrow 804, and inserted in to the tape drive 806 by means of a picker device (not shown). Disposed on the tape cassette magazine 800 is a bar code identifier 805 adapted to identify the tape cassette magazine 800 which has utility should the tape cassette magazine 800 be archived in a media pack storage vault, for example.

Referring to FIG. 6A shown therein is an exterior view of the T950 library 600. The T950 library 600 substantially defines a box-like structure that substantially encases the library of FIGS. 6B-6E. The front surface 614 comprises an operator interface (such as a graphical user interface of the type described in connection with, for example, FIG. 2) that is implemented with a touch screen 612, and a grill structure 616 that covers the fans 632 for promoting air circulation within the T950 library 600. The front surface 1214 is removable so that the library 600 can be cascaded with at least one add-on unit to expand the library 600. The viewable side surface 604 shows a first clear panel 628 that allows an operator to view the interior of the library 600. The top surface 608 of the library 600 includes a pair of knockouts 606 and 602 that can be used to receive one or more AC cables that are connected to the power supply 648 and/or one or more computer cables that are used to connect the T950 library 600 to a host computer. Associated with the bottom surface 620 are casters (not shown) that facilitate movement of the T950 library 600 and adjustable stands (not shown) that allow the T950 library 600 to be leveled after the T950 library 600 has been positioned in a relatively permanent location. Further associated with the bottom surface 620 are openings (not shown) for receiving one or more AC cables that are connected to the power supply 648 and/or a computer cable(s) that are used to connect the T950 library 600 to a host computer.

With reference to FIG. 6B, shown therein, is the T950 library 600 without the enclosure as shown in FIG. 6A. Generally, the T950 library 600 comprises a first shelf system 630 that is adapted to support the mobile media 701 and 801 archived by the library 600. In one embodiment of the present invention, the footprint of a tape cassette magazine 800 and a disc drive magazine 701 are substantially identical for compatibility when archiving in the first shelf system 630 or moving the mobile media 701 and 801 within the library 600. The T950 library 600 further comprises a user definable space 636 capable of comprising additional shelf space 638 for mobile media 701 and 801 and/or space dedicated for drives, such as tape drive(s) 806 and/or disc drive magazine docking station(s) 702. Functionally interposed between the user definable space 636 and the first shelf system 630 is a magazine transport space 634. The magazine transport space 634 is adapted to provide adequate space for a magazine 701 and 801 to be moved from a position in the first shelf system 630, for example, to a drive, such as a tape drive 806. Magazines 701 and 801 can be transferred into and out from the T950 library 600 via an embodiment of an entry/exit port 642. Transferring magazines 701 and 801 in an out of the T950 library 600 can be accomplished by an operator for example. The T950 library 600 comprises a means for cooling as shown by the fans 632 (embodiment), located at the base of the library 600.

With reference to FIG. 6C, shown therein is the T950 library 600 without the enclosure of FIG. 6A (rotated 180°) exposing the user definable space 636. The user definable space 636, herein, shows a column of additional shelves 638 for archiving media 701 and 801, a block of four disc drive magazine docking stations 702, a block of four tape drives 806 and additional vacant user definable space 650. The T950 library 600 also comprises an embodiment of a controller bridge circuit, the Spectra Logic Fiber channel Quad Interface Processor (FQIP) 646, and an embodiment of the power supply 648 capable of converting AC current to DC current for consumption by the library 600.

With reference to FIG. 6D, shown therein is an interior sectioned view of the T950 library 600 showing the first shelf system 630. An embodiment of a magazine transport 662 is illustratively shown herein with a populated tape cassette magazine 801 resting on top of a magazine support platform 666 under the influence of gravity. In this embodiment, the magazine support 666 comprises a means to pull a magazine 701 or 801, such as a hook and conveyor device, from the first shelf system 630 onto the magazine support 666 wherein the magazine support 666 remains in a substantially stationary position throughout the process. Once on the magazine support 666, a magazine 701 or 801 can be positioned substantially anywhere in the magazine transport space 634 by the magazine transport 662.

FIG. 6E is an interior sectioned view of the T950 library 600 showing the user definable space 636. As illustratively shown, the column of additional shelf space 638 is populated with both disc drive and populated tape cassette magazines 701 and 801. The block of four disc drive magazine docking stations 702 and the block of four tape drives 806 and additional vacant user definable space 150 comprises the space adjacent to the column of additional shelf space 638. The magazine transport 662 is capable of positioning a magazine, such as a disc drive magazine 701, to be loaded by a loading means into a docking station 702 wherein the magazine support 666, in one embodiment, remains in a substantially stationary position throughout the process.

The T950 library 600 is capable of bridging communication between at least two different communications protocols on either side of the FQIP 646. The FQIP 646 functions as a combination bridge controller device enabling communication between the T950 library 600 and a client in a fiber channel protocol, for example, and communication from the FQIP 646 to a drive, such as one of the four docking stations 702, for example, in a SCSI channel protocol. Furthermore, the FQIP 646 is adapted to direct data for storage on a specific drive, such as the docking station 702, from a plurality of drives, such as the other seven tape drives and docking stations 806 and 702. Directing data traffic may be necessary should the T950 library 600 be divided into partitions wherein a first client may be allocated a first partition, or fraction, of the library's 600 storage capacity and resources (for example 60 percent of the storage space within the library 600) and a second client allocated the remainder of the library's 600 storage capacity and resources (for example 40 percent of the storage space within the library 600) in a second partition.

In accordance with the present invention, the FQIP 646 can be modified to include at least one encryption/decryption chip, such as the 7956 or 8155 class chip from Hifn Inc., of Los Gatos, Calif., for example. Each Hifn chip is adapted to encrypt and decrypt small packets of data (up to, for example, 32 K-byte data packets) because the Hifn chips are designed for network to network applications. Consequently, the FQIP 646, in one embodiment, generally comprises at least one CPU (Central Processing Unit), at least one volatile memory chip, a PCI bus, at least one Hifn chips, at least one fibre chips and at least one SCSI chips to accommodate the 32 K-byte data packets. Generally, data received are segmented in software into data packets no larger than 32K-bytes and sent to the Hifn chip for encryption and then reassembled with meta data for each 32K data packet, or block, and sent to the drive, via the SCSI chip as one (slightly larger than the original) tape write command. To elaborate for purposes of illustration, data is received from a client, such as in a steaming tape format, by a fibre chip which in turn sends to the memory chip in 64

K-byte packets. Once in volatile memory, the 64K-bytes of data are segmented in to 32 K-byte data packets and sent along with an Initialization Vector (IV), which introduces a random element to each data packet for additional security, key to the Hifn chip for encryption. Block headers, such as the header associated with block-1 412 of FIG. 4, can provide space for an IV associated with the encrypted data set. Used with a secret key to encrypt data, an IV is a continuously changing number for preventing a text sequence that is identical to a previous text sequence from producing a duplicate ciphertext when encrypted. The encrypted 32K-byte data packets are then reassembled in the volatile memory along with the meta data, which includes the moniker associated with the key and MAC data unique to each data packet, and sent to the mobile media via the SCSI chip. For decryption, the encrypted data and meta data are retrieved from the storage media and put into the volatile memory whereby the encrypted data packets along with the IV, MAC and key identified by the moniker from the meta data are transmitted to the Hifn chip for decryption and then reassembled back to the original streamed form in the volatile memory for transmission to the client. As one skilled in the art will appreciate, data libraries routinely store several G-bytes of data at a time. The FQIP 646 is linked via a CAN (not shown) with a graphic user interface 612 that is accessible by an operator using the library 600. The graphic user interface 612 is a medium though which an operator can input storage options such as number and size of partitions, moniker associated with the key (wherein the key, in one embodiment, can be internally uniquely generated), backup routines, etc.

In one illustrative embodiment consistent with the present invention, the T950 library 600 can be set up to optionally provide a clear text region specifically for tape header information, such as the clear text space 102 of FIG. 2A. The tape header information can include identification information about the tape, such as bar code information, tape storage capacity, tape model and manufacturer, original storage device, date of set up, client, partition, type of data on tape, etc. The T950 library 600 can be set up via a monitor and keyboard, for example, at the client end when linked with the T950 library 600. Set up can be done by the web interface of the LCM (not shown) and sent over a fiber channel pathway, for example, to the FQIP 646 over T950 library's 600 Controller Area Network. In the event the library 600 is set up with a specific partition allocated to the client, the options for data storage in the specific partition can include data conditioning such as compression, encryption and so on. Options for setup include data conditioning, such as data encryption with further options to setup a clear text field, such as the first space 202 of FIG. 2, for header information on the storage element, such as a tape cassette 802 for example. An exemplary list of options presented on the client monitor can be:

(a) Enable Clear Text (or disable it)

(b) Type of clear region (Filemarks or Kbytes)

(c) Size of clear region (number of Filemarks or number Kbytes).

Tape header information is by standard ISV's is generally 16 Kbyets to 128 Kbytes, hence a default option for 128 Kbytes can also be provided. Tape header information stored in clear text can provide information about the tape read by anyone at any time without accessibility to the user data, such as when the user data is stored in encrypted form on the storage element.

Once the header information is stored in clear text in the clear text header region, a data package is received by the client over the fiber channel pathway to the FQIP 646 for storage in the specific partition of the library 600 allocated to the client. The data package is buffered then encrypted by a Hifn encryption chip comprised by the FQIP 646 in 32 K-byte packets, or blocks, and transmitted to a drive in cooperation with a mobile storage medium, such as the tape drive 806 and tape cassette 802, allocated to the client's partition. In addition to the encrypted data blocks, a moniker associated with a decryption key capable of decrypting the data blocks and a MAC capable of verifying proper decryption are transmitted for storage by the FQIP 646 on the tape cassette 802 in block headers, such as 411 of FIG. 4, which in the current embodiment, are stored as clear text. One skilled in the art will recognize that the block headers and trailers are different from the dedicated clear text space 202 because the block headers are typically arranged by the tape library in a format for the tape library to manage data stored on tape in streaming protocol. Block headers, and trailers, are not equivalent in any way to tape headers because tape headers are intended to provide information about the tape and not the blocks. Block headers can co-exist in the clear-text space 202 should the clear text space 202 be divided into blocks. Optionally, the moniker/s can be stored in the clear text header region 202. The MAC can be generated by the Hifn chip that encrypts the data. The moniker can be a nickname such as 'SALLY', for example, and can be used to quickly identify the associated decryption key which can be one from a set of a plurality of decryption keys. In this embodiment, the moniker is stored in the block headers and the decryption key is stored exclusively in the library 600. Upon creation of the key, a user, for example, can request a key associated with the moniker "SALLY" whereby a key can be randomly and uniquely generated for that moniker. "SALLY" cannot be used twice within the same library partition because every moniker will be associated with a uniquely generated key. In an alternative embodiment, the client need not be aware that their data is stored in an encrypted format. In this embodiment, management of an encryption key may be solely done by the library 600, for example.

Upon a requested to decrypt the data, such as by the client, the key comprising the decryption code is required to decrypt the data can be identified by use of the moniker stored on the media Once the moniker is read, the T950 library 600 can provide the decryption key and enabling decryption of the data. In some alternative options, the key can exist with the client or with a third party, for example. The encryption key can be changed in desired increments of time such as every week, for example. The encryption key can be different for each client, data package received, etc.

The MAC is used as a means to verify that the data when decrypted is identical to the data that was originally received from the client prior to encryption. In the event the decrypted data has been corrupted or changed from when the data was originally received by the client, an error will be sent to the client that the data has not been successfully decrypted, or in the case where a client is unaware of encrypted data, a retrieval error will be sent.

Optionally, a moniker is not needed; rather the verification from the HMAC that the data has been successfully decrypted can be used. In this option, the set of keys used for encryption can be tried in succession, for example, until the data has been verified as decrypted.

It is to be understood that even though numerous characteristics and advantages of various embodiments of the present invention have been set forth in the foregoing description, together with the details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, multiple monikers can be used with multiple keys for one set of data to increase complexity in security, while still maintaining substantially the same functionality without departing from the scope and spirit of the present invention. Another embodiment can include using these techniques in addition to data compression in a same chip, to name a few examples while still maintaining substantially the same functionality without departing from the scope and spirit of the present invention. Further, though communication is described herein as between a client 102 and the library, such as the library 100, communication can be received by the drive, such as the first drive 104, via the combination bridge controller device 114, for example, without departing from the scope and spirit of the present invention. Further, for purposes of illustration, a first and a second drive and media are used herein to simplify the description for a plurality of drives and media. Furthermore, management of the content in the clear text space, such as the space 202 of FIG. 2A, can vary depending on the needs of a client. This space is intended for non-secure information that can be read without decryption keys or special data conditioning reversal engines. A skilled artisan will recognize that although the clear text space 202, in the described embodiments, is located at the beginning of a tape 200, other locations on the tape can be used without departure from the invention. Finally, although the preferred embodiments described herein are directed to disc drive systems, such as the disc drive magazine 701, and tape storage systems, such as tape cassettes 802 and tape drives 806, and related technology, it will be appreciated by those skilled in the art that the teachings of the present invention can be applied to other systems, without departing from the spirit and scope of the present invention.

It will be clear that the present invention is well adapted to attain the ends and advantages mentioned as well as those inherent therein. While presently preferred embodiments have been described for purposes of this disclosure, numerous changes may be made which readily suggest themselves to those skilled in the art and which are encompassed in the spirit of the invention disclosed and as defined in the appended claims.

What is claimed is:

1. A storage library comprising:
a plurality of data storage elements wherein at least one of the plurality of data storage elements possessing a magnetic recording tape formatted with a first space allocated for storing tape header information, the tape header information possessing at least one attribute about the tape cassette in essentially clear text, and a second space allocated for storing at least encrypted data; and
a plurality of drives, each capable of writing data to one of the data storage elements.

2. The storage library of claim 1 wherein the first space is further capable of storing at least an attribute about the data stored in the second space in an identification field.

3. The storage library of claim 1 wherein the first space is accessible by an independent software vendor host.

4. The storage library of claim 1 wherein the first space is at the beginning of the tape.

5. The storage library of claim 1 comprising a means to render any content on the tape unique to the tape and upon copying the content to a second magnetic recording tape the second tape will indicate that the content is a copy.

6. The storage library of claim 5 wherein the means to render any of the content on the tape unique is accomplished with a secure hash algorithm that is disposed in the first space.

7. The storage library of claim 1 wherein the encrypted user data is divided in at least a first and second subdivision wherein the first subdivision is associated with a first key and the second subdivision is associated with a second key.

8. The storage library of claim 7 wherein the first key expires after a first predetermined condition and the second key expires after a second predetermined condition.

9. The storage library of claim 8 wherein the first space provides information to bypass the first subdivision after the first key expires.

10. The storage library of claim 1 wherein the first space further comprises a moniker to identify a decryption key associated with the encrypted data.

11. The storage library of claim 1 wherein the encrypted data in the second space is also compressed.

12. The storage library of claim 1 wherein the first space comprises data blocks and data block headers.

13. The storage library of claim 12 wherein the data blocks are of variable length.

14. The storage library of claim 1 further comprising a marker delineating the first space from the second space.

15. The storage library of claim 1 wherein the first space has fixed storage capacity.

16. A method for formatting a magnetic recording tape comprising a first space and a second space wherein the tape is capable of receiving tape header information and user data from a host computer, the method comprising:
dedicating the first space of the magnetic recording tape for clear text;
storing the tape header information in the first space as received by the host computer; and
storing the user data in encrypted form in the second space.

17. The method of claim 16 further comprising storing a moniker in clear text in block headers in the second space.

18. The method of claim 16 further comprising delineating the first space from the second space with a file marker.

19. The method of claim 16 further comprising an option to set up the first space by either number of file marks having a fixed size or number of data bytes.

20. A storage library comprising:
an encryption engine capable of encrypting a set of data received from a host computer wherein the set of data comprises at least both user data and data storage element header data;
a plurality of data storage elements capable of storing the set of data;
at least two drives, each adapted to write data to one of the data storage elements; and
a means for providing the data storage element with a first storage space and a second storage space wherein the first storage space is dedicated for writing only at least a portion of the set of data in clear text form from the host computer which portion includes at least the data storage element header data, and wherein the second storage space is capable of storing the user data in encrypted form.

21. A storage library comprising: a mobile data storage element formatted with a first data storage space for storing data in the form of essentially only clear text information that includes tape header information and a second data storage space for storing the data, at least some of which is encrypted; and at least one drive capable of writing the data to the mobile data storage element.

* * * * *